United States Patent Office 3,809,533
Patented May 7, 1974

3,809,533
ETHOXYETHANOL, GLYCOL, WATER
DYE SOLUTION
Frederic L. Sievenpiper, Alden, N.Y., assignor to Allied Chemical Corporation, New York, N.Y.
No Drawing. Filed Apr. 28, 1972, Ser. No. 248,554
Int. Cl. C09b 67/00
U.S. Cl. 8—93          1 Claim

ABSTRACT OF THE DISCLOSURE

A liquid solvent composition containing an organic dye, especially suitable for solvent dyeing operations, comprises 40–80 volume percent alkoxyl alkanol, 5–40 volume percent of an alkylene glycol and 2 to 25 volume percent of water.

BACKGROUND OF THE INVENTION

The present invention relates to a dyeing composition. More particularly the present invention relates to a composition especially adapted for use in solvent dyeing.

Recent innovations in dyeing textiles and like materials have included a process known as "solvent dyeing." This process has found much interest in the dyeing industry due to the rapidity of the dyeing operation and the short drying time required. Heretofore the solvent dyeing operations have usually been carried out by dissolving a dyestuff into a mixture of solvents, one of which is a volatile inert liquid halogenated organic compound boiling below about 160° C. and the other is usually a liquid organic solvent having a boiling point about 180° C. One such dyeing procedure involves wetting, for example, padding, the fibrous material with a dye formulation dissolved or dispersed in the liquid mixture of volatile organic solvents, heating the resulting mixture of dyestuff, solvents and fibrous material thus removing the solvents, which are collected, while simultaneously fixing the dyestuff on the fibrous material by means of heat.

Despite the interest in solvent dyeing operations heretofore practiced, the process and solvents heretofore used have suffered various disadvantages. Firstly, the solvent mixture employed must be one that will operate with all types of dyes. Secondly, the use of halocarbon solvents tends to corrode the equipment, which is of course undesirable. Also, some of the mixtures of solvents are extremely difficult to recover for reuse in the solvent dyeing operations due to the fact that the separation of the solven mixture into its components, in a state pure enough for reuse, is not always possible by conventional means.

It is therefore an object of this invention to provide a dyestuff composition suitable for solvent dyeing.

It is a further object of this invention to provide a dyestuff composition comprising a dye dissolved in a solvent.

It is yet a further object of this invention to provide a dyestuff composition comprising a mixture of solvents and a dyestuff in which the mixture of solvents has a general utility as a solvent for various types of dyestuffs.

These and other objects will be apparent from the description which follows:

BRIEF SUMMARY OF THE INVENTION

In accordance with this invention there is provided a dyestuff composition comprising an organic dyestuff dissolved in a solvent mixture comprising:

(a) 40–80 weight percent of a compound having a formula HO—R—O—R'
(b) 5–40 weight percent of the compound having the formula HO—R"—OH and
(c) 2–25 weight percent of water, wherein, R is an alkylene radical containing 1–5 carbon atoms, R' is an alkyl radical containing 1–5 carbon atoms, and R" is an alkylene radical containing 2–6 carbon atoms.

These solvent compositions as described have been found to dissolve disperse dyes, acid dyes, direct dyes, and other sulfonic acid dye derivatives and cationic dyes. In addition to its excellence as a better solvent for a wider variety of dyes, adjuvants and finishes, the mixture has other advantages. It permits co-application of mixed dyes on blended textiles, provides homogeneous solutions for more uniform application and better selectivity of each dye class on its appropriate fiber, i.e., results in less crossstraining. Also, the alkoxyalkanol (a), accelerates the rate of dyeing when compared to the use of halogenated hydrocarbons. Both of the organic components, i.e., (a) and (b) are recoverable and readily separable. Furthermore, they are less corrosive than halo-hydrocarbons to the solvent dyeing equipment.

DETAILED DESCRIPTION OF THE INVENTION

Commercially acceptable dyed fabrics have been obtained when the dyestuff is dissolved or dispersed in a volatile organic solvent mixture having a boiling point above about 40° C. but below the softening point of the fibrous material. It is also known to be advantageous to employ as a part of the dye formulation a dyeing adjuvant which may, e.g., function as a fiber-swelling agent, such as an alkylene carbonate. The preferred process of application of the dyestuff compositions of the present invention functions essentially by first padding or otherwise wetting the fibrous material with a controlled amount of dye formulation, and fixing the dyestuff on the fibrous material while the latter is maintained in a zone of vapors of the same or different solvent for from about 10 to about 180 seconds. The vapor zone can conveniently be established by various means, such as boiling solvent at the bottom of the zone, employing heated drums or "cans" within the vapor zone over which the fibrous material is passed, or the zone can be supplied with vapors, which may be superheated, from a source external of the zone. The escape of vapors from the vapor zone may be prevented by providing a vapor-condensing means which establishes the upper volume limit of the vapors and removes vapor in excess of that required to fill said zone. The condensed vapors may be reused in the dye formulations, or solvent vapor zones. Another such solvent dyeing procedure found to be effective is that in which the fibrous material is immersed in a bath of solvent mixture plus dyestuff, heated to fix the dye, then removed, washed with solvent and dried.

Substantially any fibrous material, commercially available, whether natural or manmade fibers or blends thereof, can be dyed with the dyestuff compositions of the present invention. Thus, the naturally occurring fibers such as wool and cotton, and the synthetic fibers, such as nylon, the polyesters, the acetates, rayon, the acrylics, polypropylenes and polyethylenes, can be dyed, as well as blends of these fibers with a wide range of conventional dyestuffs.

Exemplary of the dyes suitable for use in the compositions of the present invention are the disperse, cationic, acid, basic, direct dyes, as well as dyes in solvent soluble state, i.e., soluble in an organic solvent.

Representative disperse dyes, suitable for use in the compositions of the present invention are:

C.I. Disperse Yellow 1 (C.I. 10345)
C.I. Disperse Yellow 3 (C.I. 11855)
C.I. Basic Yellow 1 (C.I. 48055)
C.I. Basic Orange 21 (C.I. 48035)
C.I. Disperse Orange 11 (C.I. 60700)

C.I. Disperse Red 11 (C.I. 62015)
C.I. Acid Red 114 (C.I. 23635)
C.I. Disperse Red 1 (C.I. 11110)
C.I. Disperse Red 13 (C.I. 11115)
C.I. Disperse Red 35
C.I. Disperse Blue 7 (C.I. 62500)
C.I. Acid Blue 25 (C.I. 62055)
C.I. Disperse Blue 14 (C.I. 61500)
C.I. Disperse Blue 27
C.I. Basic Green 4 (C.I. 42000)
C.I. Basic Violet 14 (C.I. 42510)
C.I. Disperse Yellow 37
C.I. Disperse Yellow 9 (C.I. 10375)
C.I. Direct Yellow 12 (C.I. 24895)
C.I. Acid Orange 86
C.I. Direct Red 31 (C.I. 29100)
C.I. Acid Red 209
C.I. Disperse Red 19 (C.I. 1130)
C.I. Basic Red 13 (C.I. 48015)
C.I. Disperse Red 3
C.I. Disperse Blue 26 (C.I. 63305)
C.I. Acid Blue 40 (C.I. 62125)
C.I. Basic Blue 21
C.I. Disperse Blue 19 (C.I. 61110)
C.I. Direct Blue 55 (C.I. 27940)
C.I. Direct Green 12 (C.I. 30290)

Representative acid dyes are:

C.I. Acid Blue 40 (C.I. 62125)
C.I. Acid Blue 25 (C.I. 62055)
C.I. Acid Red 209
C.I. Acid Red 114 (C.I. 23635)
C.I. Acid Blue 113 (C.I. 26360)
C.I. Acid Blue 102 (C.I. 50320)
C.I. Acid Red 39
C.I. Acid Orange 56 (C.I. 22885)
C.I. Acid Orange 3 (C.I. 10385)
C.I. Acid Yellow 1 (C.I. 10316)
C.I. Acid Yellow 29 (C.I. 18900)

Representative basic dyes are:

C.I. Basic Blue 21
C.I. Basic Blue 22
C.I. Basic Blue 9 (C.I. 52015)
C.I. Basic Blue 26 (C.I. 44045)
C.I. Basic Blue 1 ((C.I. 42025)
C.I. Basic Green 4 (C.I. 42000)
C.I. Basic Orange 21 (C.I. 48035)
C.I. Basic Orange 22 (C.I. 48040)
C.I. Basic Red 13 (C.I. 48015)
C.I. Basic Red 14
C.I. Basic Violet 7 (C.I. 48020)
C.I. Basic Red 1 (C.I. 45160)
C.I. Basic Yellow 11 (C.I. 48055)
C.I. Basic Yellow 13

Representative direct dyes are:

C.I. Direct Red 31 (C.I. 29100)
C.I. Direct Yellow 12 (C.I. 24895)
C.I. Direct Green 12 (C.I. 30290)
C.I. Direct Blue 55 (C.I. 27940)
C.I. Direct Red 81 (C.I. 28160)
C.I. Direct Blue 67 (C.I. 27925)

As is well known in this art, organic dyestuffs in solvent soluble state, such as solvent dyes, for example, amine salts of acid and/or direct dyestuffs, are highly soluble in a variety of organic solvents. Accordingly, such organic salts, for example as formed by reaction of an acid or direct dye containing at least one sulfonic acid group or alkali metal salt thereof with an organic base, such as amine, constitute a preferred class of dyestuffs for the compositions of the present invention. Concentrated solutions of such dyestuffs may be prepared from dyestuff compositions of commerce by the following general procedure:

An amount of an acid or direct dye, e.g. one normally available as the alkali metal salt of a sulfonic acid, is slurried in a convenient amount of water at 80° to 90° C. To the slurry, an amount of acid, e.g. acetic acid or hydrochloric acid, is added to render the slurry acid, e.g. pH of about 2 to 4. An approximately equivalent amount of an organic base, e.g. dioctylamine, is then added, forming the organic amine salt of the dyestuff which salt is insoluble in water, and separates from the aqueous mother liquor as an oily phase. The aqueous portion, containing dissolved therein inorganic salts, is removed and the oil layer is dissolved in an organic solvent, e.g. ethoxy ethanol. This solution may be washed with 1 percent aqueous acetic acid to remove salts occluded in oil layer. The solvent solution of the dyestuff is dried by azeotropic distillation and the dye solution filtered to remove insolubles. The solution can be adjusted to the desired dyestuff concentration by addition of solvent.

In an analogous manner organic solvent solutions of cationic dyestuffs, which are usually marketed as mineral acid salts, can be prepared by slurrying the dye in water and basifying the slurry with an alkali, e.g. soda ash. The free basic dyestuff is then converted to an organic solvent soluble form by addition of an organic acid, e.g. propionic acid. Thereafter, the addition of organic solvent permits the separation of water and dyestuff solution which can be treated as described above.

The aforementioned dyestuffs are illustrative of the many and varied types of colorants which can be employed in the formulations of the present invention. It is pointed out, however, that the particular textile(s) being dyed determines the class of dyestuff used and thus it is not suggested or inferred that any dyestuff may be used to color any textile.

As above indicated, the solvent mixture of the present invention comprises 40 to 80 percent by volume of a compound having a formula HO—R—O—R', wherein R is an alkylene radical containing 1 to 5 carbon atoms and R' is an alkyl radical containing 1 to 5 carbon atoms. Exemplary compounds falling within this general formula are: methoxyethanol, ethoxyethanol, ethoxybutanol, propoxybutanol, butoxybutanol, ethoxypentanol, pentoxyisopropanol, methoxyethanol, and the like.

Component (b) of the solvent mixture of this invention is a diol of the formula HO—R"—OH, when R" is an alkylene radical containing 2 to 6 carbon atoms. Exemplary of compounds falling within this general formula are: ethylene glycol, diethylene glycol, triethylene glycol, 1-3-propane diol, 1,3-butane diol, 1,5-hexane diol, and the like.

The amounts of the compositions employed in the solvent mixture of this invention may be varied depending upon the solubility of the dyes being used, the dyeability of the fiber to be processed, and the method and equipment to be used.

Component (a), i.e., HO—R—O—R", generally comprises 40–80 volume percent of the mixture, preferably 50 to 70 percent, Component (b), i.e., HO—R"—OH, will comprise 5–40 volume percent of the mixture, preferably 10–30 percent and the water will comprise the rest of the mixture, i.e., 2–25 weight percent, preferably 5–20 volume percent. A particularly preferred solvent mixture in accordance with this invention is a dyestuff dissolved in ethoxyethanol, ethylene glycol, and water in a weight ratio of 4:1:1. Such a solvent mixture has been found to dissolve nearly all types of dyes mentioned and both of the organic components are readily recoverable and separable for reuse in the solvent dyeing operation.

DESCRIPTION OF THE PREFERRED EMBODIMENTS

The following examples are given by way of illustration only and are not to be considered limiting in any manner.

Example I

½ gram of Direct Blue #67 (C.I. 27925) was dissolved in a solution of 25 ml. of water and 25 ml. of ethylene glycol. This solution was added to another solution prepared from ½ of a gram of Polyester Red B Base (Disperse Red #88) and 100 ml. of ethoxyethanol.

The dyeing process was conducted by passing a textile, in this case, a polyester-cotton fabric, woven in a checkered pattern, through a padding device, by which means the dyestuff composition of the present invention was introduced onto and into the textile fabric. The so wetted textile fabric was passed through squeeze rollers to remove liquor in excess of 142 percent of the weight of the fabric and into a zone filled with superheated vapors, i.e., 145° C., of perchloethylene, until fixation of the dyestuff had taken place. The exposed fabric was then directed over heated cans or rolls whereby the solvents remaining on the dyed fabric were flashed off. The dried fabric was then scoured with a 2 percent aqueous solution of alkylbenzene sulfonate and redried. The resulting fabric was deeply dyed in a red and blue pattern free of cross staining.

Example II

A solution comprising 300 mg. of Nabor Blue LWS (C.I. Basic Blue 45) and 300 mg. of Nabor Yellow L2G (C.I. Basic Yellow 28) and 400 ml. of ethoxyethanol, 100 milliliters of ethylene glycol, and 100 ml. of water, containing 3 ml. of phenoxyethanol, as a dye assistant, was introduced into a Buchi dry cleaning unit. To this solution was added two samples, 30 grams each, of double knit fabric composed of polyethylene terephthalate fibers, one sample being acid-dyeable Dacron type 92 and the other sample being disperse-dyeable Dacron type 56. The mixture was agitated for 10 minutes at ambient temperature and thereafter the temperature was raised to 118° C. over a period of 15 minutes and held at that temperature for an additional 30 minutes. The fabric was withdrawn, washed successively with two 300 ml. portions of solvent containing 240 ml. of perfluoroethylene and 60 ml. of ethoxyethanol, then centrifuged and dried. The Dacron type 92 fabric was deeply dyed an olive green color while the Dacron type 56 remained completely unstained. This example indicates that the dyestuff-solvent compositions of this invention provides excellent selectivity of each dye class for application to its appropriate fiber.

It will be understood that other additives may be added to the dye bath such as solvent soluble heat curable finishes and other dyeing adjuvants.

What is claimed is:

1. A dyestuff composition comprising an organic dyestuff dissolved in a solvent mixture comprising
    (a) ethoxy ethanol,
    (b) ethylene glycol and
    (c) water,
wherein the volume ratio of (a):(b):(c) is about 4:1:1.

References Cited
UNITED STATES PATENTS

| | | | |
|---|---|---|---|
| 2,047,650 | 7/1936 | Sala | 8—93 |
| 3,617,183 | 11/1971 | Grosklos | 8—93 |
| 3,346,322 | 10/1967 | Finkenauer | 8—79 |

DONALD LEVY, Primary Examiner

U.S. Cl. X.R.

8—21 R, 39, 41 R, 21 C, 169, 80, 142, 17.